United States Patent

Huggins et al.

[11] Patent Number: 5,845,544
[45] Date of Patent: Dec. 8, 1998

[54] CONTROL MODULE

[75] Inventors: Michael J. Huggins; David L. Wadas; Alan C. Stine, all of Kalamazoo; Joseph D. Reynolds, Climax, all of Mich.

[73] Assignee: Eaton Corporation, Cleveland, Ohio

[21] Appl. No.: 679,879

[22] Filed: Jul. 15, 1996

[51] Int. Cl.⁶ ................................................. F16H 59/00
[52] U.S. Cl. .......................................... 74/606 R; 74/335
[58] Field of Search ................................... 74/606 R, 335

[56] References Cited

U.S. PATENT DOCUMENTS

| | | | |
|---|---|---|---|
| 4,719,812 | 1/1988 | Mavchida et al. | 74/606 R X |
| 4,920,812 | 5/1990 | Reynolds | 74/335 |
| 5,222,404 | 6/1993 | Stine | 74/335 |
| 5,361,650 | 11/1994 | Klecker et al. | 74/606 R |
| 5,390,561 | 2/1995 | Stine | 74/331 |
| 5,417,124 | 5/1995 | Huff et al. | 74/335 |
| 5,450,767 | 9/1995 | Willford et al. | 74/335 |
| 5,509,329 | 4/1996 | Jackson et al. | 74/335 X |
| 5,599,247 | 2/1997 | Matsufuji | 74/335 X |

*Primary Examiner*—Rodney H. Bonck
*Assistant Examiner*—Saúl J. Rodríguez
*Attorney, Agent, or Firm*—Howard D. Gordon

[57] ABSTRACT

A control module assembly (200) for mounting as a unit to the housing (116) of a compound transmission (110). The module assembly includes a module housing (202) defining electric (207) and fluid (208) connectors and having an interior containing a position sensor (218) interacting with a transmission shift shaft (188), cavities (212 and 214) defining auxiliary section actuator piston cylinders (204B and 206B), solenoid control valves, a printed circuit board, and various interior electric and fluid conduits.

15 Claims, 7 Drawing Sheets

CONTROL MODULE

BACKGROUND OF THE INVENTION

1. Related Applications

This application is related to copending U.S. Ser. No. 08/627,808, filed Apr. 10, 1996, entitled TWO-PIECE HOUSING FOR COMPOUND TRANSMISSION, and assigned to EATON CORPORATION, the assignee of this application.

This application is related to copending U.S. Ser. No. 08/695,052, filed Aug. 9, 1996, entitled SHIFT SHAFT POSITION SENSOR, and assigned to EATON CORPORATION, the assignee of this application.

2. Field of the Invention

The present invention relates to a transmission control module assembly for mounting, as a unit, to a compound transmission housing and including a shift shaft position sensor, a plurality of solenoid-controlled valves, a printed circuit board including a microprocessor-based controller for controlling auxiliary section shifting, an electrical connector, an air inlet, cup-like cavities for cooperating with bores in the housing to define cylinders for auxiliary transmission actuator pistons, and various internal electrical and fluid connections.

3. Description of the Prior Art

Heavy-duty compound transmissions comprising a main transmission section connected in series with one or more auxiliary transmission sections of the range, splitter or combined range-and-splitter type are well known in the prior art, as may be seen by reference to U.S. Pat. Nos. 3,105,395; 4,754,665; 4,944,197; 5,370,013 and 5,390,561, the disclosures of which are incorporated herein by reference. Briefly, by utilizing main and auxiliary transmission sections connected in series, assuming proper sizing of the ratio steps, the total of available transmission ratios is equal to the product of the main and auxiliary section ratios. Auxiliary transmission sections are of three general types: range type, splitter type or combined range/splitter type.

Such compound transmissions, in their manually shifted versions, typically include a main section controlled by a shift bar housing or a single shift shaft (as disclosed in U.S. Pat. No. 4,920,815, the disclosure of which is incorporated herein by reference) and a plurality of piston/cylinder actuators for controlling shifting of the auxiliary section.

In an improved compound transmission design (see aforementioned U.S. Pat. No. 5,390,531 and copending U.S. Ser. No. 08/627,808, the disclosure of which is incorporated herein by reference), the requirement for an intermediate housing wall is minimized or eliminated and the housing is provided as a two- or three-major-piece assembly.

A preferred embodiment of the above improved compound transmission utilizes a transmission housing defined by an extended cup-shaped gear housing piece and a cup-shaped clutch housing piece. The gear housing piece has a base portion for defining the transmission rear end wall, and the clutch housing piece has a base portion mounting to the open end of the gear housing piece for defining the forward end wall of the transmission. The generally tubular side walls of the gear housing piece surround and enclose the transmission housing and define bores for receiving the main and auxiliary section shifting mechanisms, while the side walls of the clutch housing piece will mount to the vehicle engine and surround the clutch or other non-positive coupling, drivingly coupling the engine to the transmission. Various minor pieces, such as PTO opening covers, PTO devices and/or bearing covers, may be attached to the two major transmission pieces. As an alternative, the gear housing piece may be split into a base piece and a tubular side wall piece.

SUMMARY OF THE INVENTION

In accordance with the present invention, the above-described improved compound transmission design is further improved by the provision of a control module which will simplify assembly and servicing of the transmission, will minimize external connections, conduits and errors in assembly, and will provide a more reliable transmission assembly.

The foregoing is accomplished by the provision of a control module assembly which is assembled as a unit to the transmission housing and which defines electrical and pressurized fluid (pneumatic and/or hydraulic) connections for the transmission. The control module assembly preferably includes a transmission controller printed circuit board, a sensor unit for sensing the rotational and/or axial position of a shift shaft, a plurality of solenoid valves, cavities to cooperate with bores in the housing to define cylinders for the auxiliary section actuator pistons, and internal electric and fluid conduits.

Accordingly, it is an object of the present invention to provide a compound transmission utilizing an improved transmission housing and a new, improved control module assembly for cooperation therewith.

This and other objects and advantages of the present invention will become apparent from a reading of the following description of the preferred embodiment taken in connection with the attached drawings.

DESCRIPTION OF THE PREFERRED EMBODIMENT

Certain terminology will be used in the following description of the preferred embodiment for convenience only and will not be limiting. The terms "upwardly," "downwardly," "rightwardly" and "leftwardly" will designate directions in the directions to which reference is made. The terms "forward" and "rearward" will refer, respectively, to the front and rear ends of the drive train components as conventionally mounted in the vehicle, being, respectively, to the left and right sides of the transmission illustrated in FIG. 1. The words "inwardly" and "outwardly" will refer respectively to directions toward and away from the geometric center of the device and designated parts thereof. Said terminology includes the words above specifically mentioned, derivatives thereof and words of similar import.

The term "compound transmission" is used to designate a change-speed or change-gear transmission having a main transmission section and an auxiliary transmission section connected in series whereby the selected gear reduction in the main transmission section may be compounded by further selected gear reduction in the auxiliary transmission section.

Figure 1:
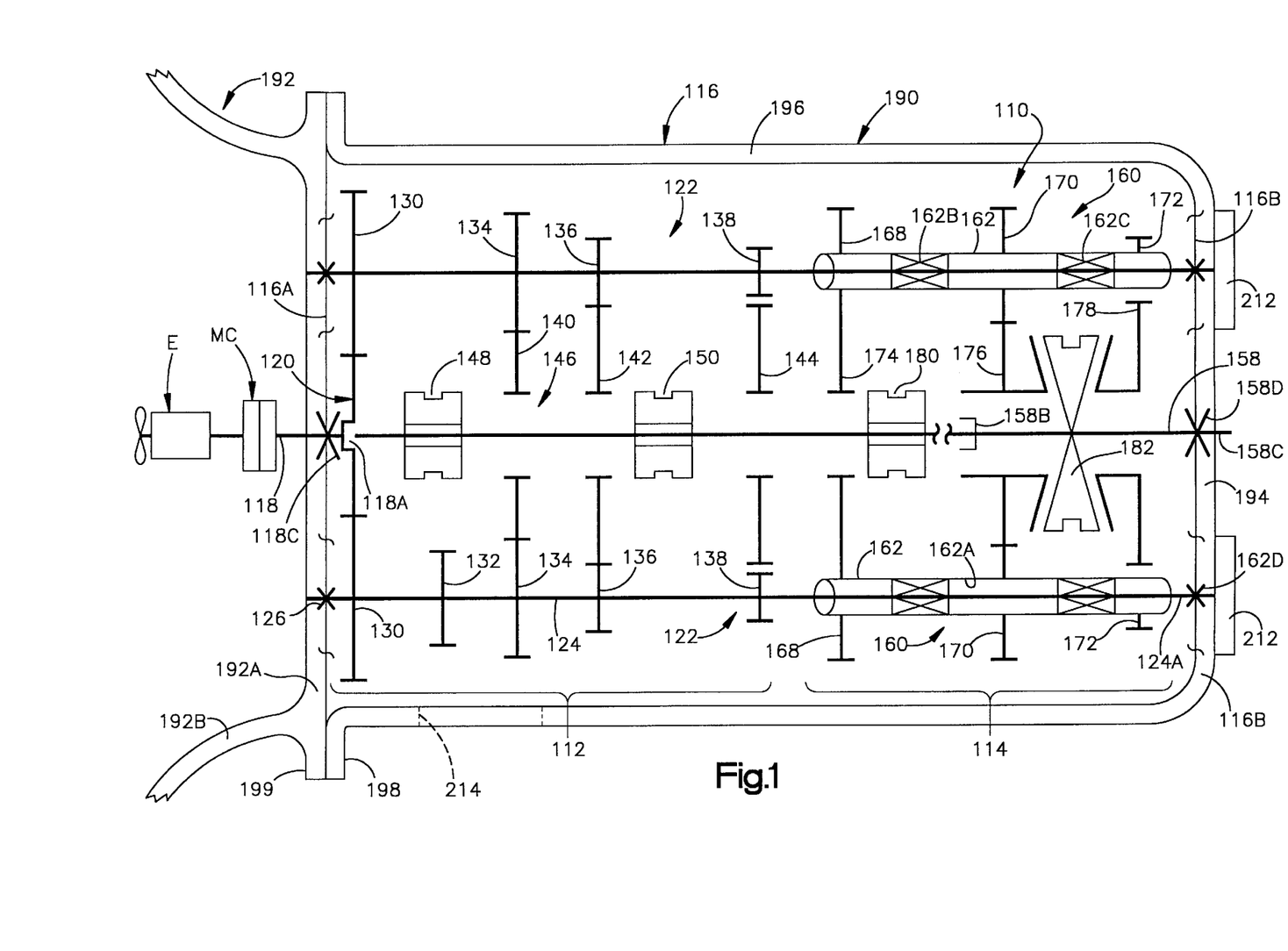
FIG. 1 is a top view schematic illustration of a compound transmission utilizing the new and improved transmission housing and control module of the present invention.
Figure 2:
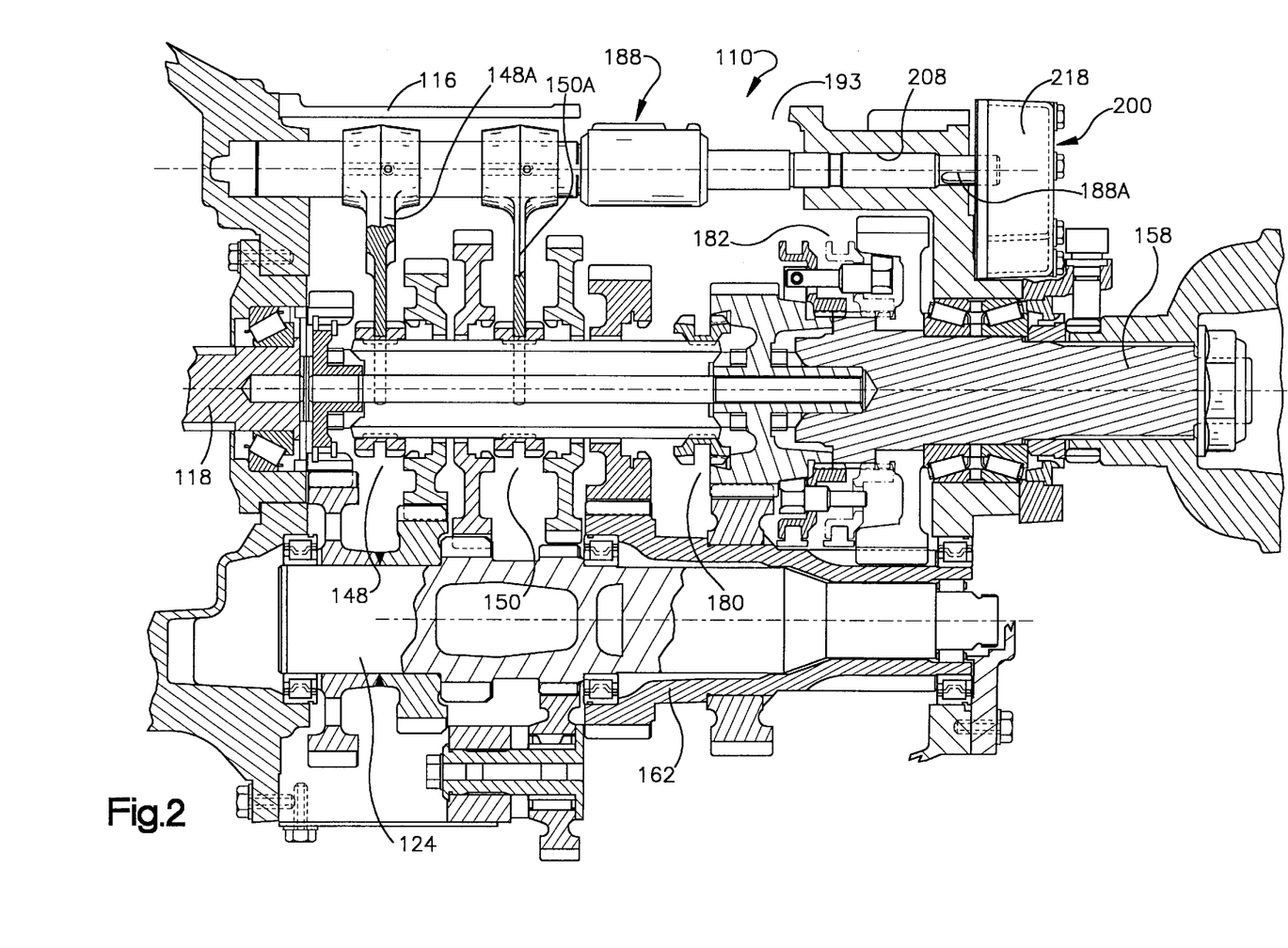
FIG. 2 is a sectional view of the transmission of FIG. 1.

Transmission 110 of the present invention may be seen by reference to FIGS. 1 and 2. Transmission 110 includes a main section 112 and an auxiliary section 114, both contained within housing 116. Housing 116 includes a forward end wall 116A and a rearward end wall 116B, but not an intermediate wall.

Input shaft 118 carries input gear 120 fixed for rotation therewith and defines a rearwardly opening pocket 118A wherein a reduced diameter extension of mainshaft 146 is piloted. A non-friction bushing or the like may be provided in pocket or blind bore 118A. The forward end of input shaft 118 is supported by bearing 118C in front end wall 116A while the rearward end 158C of output shaft 158 is supported by bearing assembly 158D in rear and wall 116B. Bearing assembly 158D may be a pair of opposed taper bearings or one or more roller or ball bearings. Input shaft 118 carries a master friction clutch MC for drivingly coupling the crankshaft of engine E to the input shaft.

The mainshaft 146 carries mainshaft clutches 148 and 150 and the mainshaft splitter clutch 180 and is supported by the inner end 158B of the output shaft 158. Shift forks 148A and 150A are provided for shifting clutches 148 and 150, respectively. Mainshaft 146 is independently rotatable relative to input shaft 118 and output shaft 158 and preferably is free for limited radial movements relative thereto. As may be seen by reference to aforementioned U.S. Pat. No. 5,390,531, tapered surfaces and/or bearings may be used between the input, main and output shafts.

The main section 112 includes two substantially identical main section countershaft assemblies 122 each comprising a main section countershaft 124 carrying countershaft gears 130, 132, 134, 136 and 138 fixed thereto. Gear pairs 130, 134, 136 and 138 are constantly meshed with input gear 118, mainshaft gears 140 and 142 and idler 157, which is meshed with reverse mainshaft gear 144, respectively. Multiple, substantially identical countershaft structures are well known in the prior art, as may be seen by reference to U.S. Pat. Nos. 3,105,395 and 3,335,616.

Main section countershaft 124 extends rearwardly into the auxiliary section, where its rearward end 124A is supported directly or indirectly in rear housing end wall 116B.

The auxiliary section 114 includes two substantially identical auxiliary countershaft assemblies 160, each including an auxiliary countershaft 162 carrying auxiliary countershaft gears 168, 170 and 172 for rotation therewith. Auxiliary countershaft gear pairs 168, 170 and 172 are constantly meshed with splitter gear 174, splitter/range gear 176 and range gear 178, respectively. Splitter clutch 180 is fixed to mainshaft 146 for selectively clutching either gear 174 or 176 thereto while synchronized range clutch 182 is fixed to output shaft 158 for selectively clutching either gear 176 or gear 178 thereto.

Auxiliary countershafts 162 are generally tubular in shape defining a through bore 162A for receipt of the rearward extensions of the main section countershafts 124. Bearings or bushings 162B and 162C are provided to rotatably support auxiliary countershaft 162 on main section countershaft 124. Bearing 162D directly or indirectly supports the rear ends of countershafts 124 and 162 in the rear end wall 116B.

Mainshaft 146 is supported solely by the input and/or output shaft, one of the countershafts, main section countershafts 124, extends from the front end wall 116A to the rear end wall 116B and the other countershafts, auxiliary countershafts 162, are tubular members telescopically surrounding the one of the countershafts. As described in aforementioned U.S. Pat. No. 5,390,561, this improved structure eliminates the intermediate wall bearings.

Figure 2A:
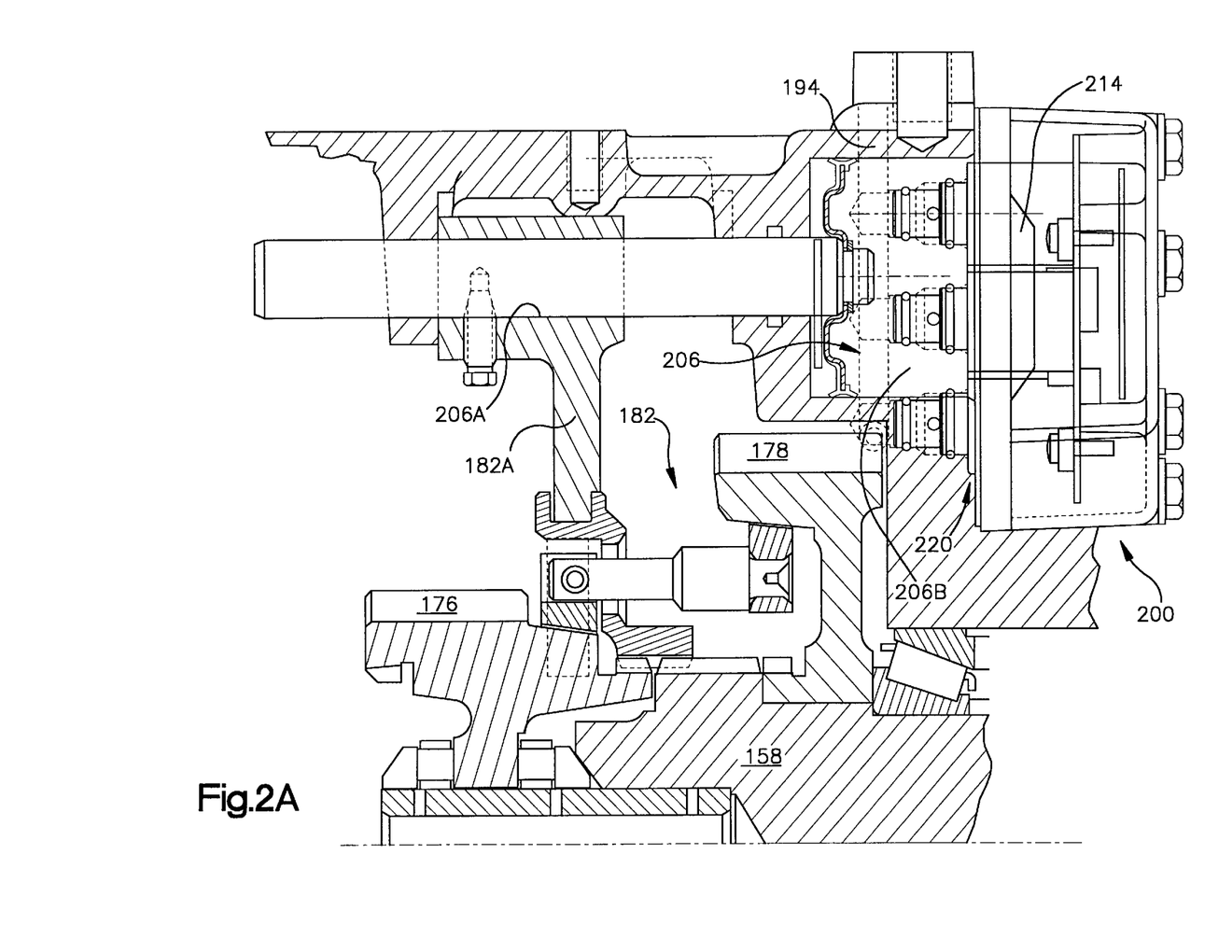
FIGS. 2A and 2B are partial sectional views of the transmission of FIG. 1.
Figure 2B:
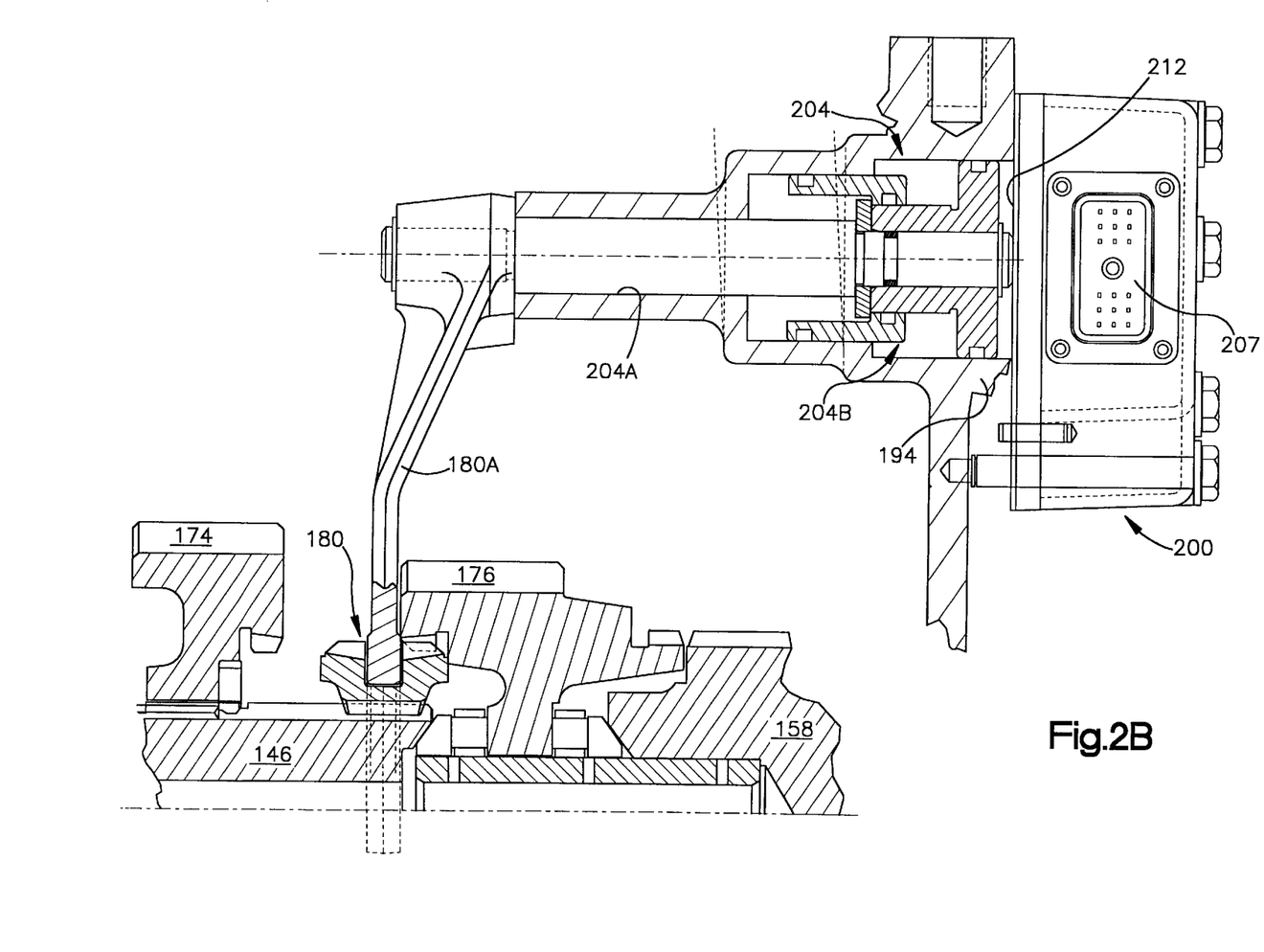

As best seen by reference to FIG. 2, main section clutches 148 and 150 are controlled by shift forks 148A and 150A, respectively, associated with a shift shaft mechanism 188, preferably a single-shift-shaft-type mechanism of the type described in U.S. Pat. Nos. 4,621,537 and 4,920,815, the disclosures of which are incorporated herein by reference. Separately (see FIGS. 2A and 2B), the splitter clutch 180 and range clutch 182 are controlled by shift forks 180A and 182A, respectively, controlled by individual and independent 2- or 3-position actuators. Typically, as is well known and will be described in greater detail below, the splitter and range actuators are pressurized, fluid-actuated piston/cylinder assemblies (see U.S. Pat. Nos. 5,199,312 and 5,222,404, the disclosures of which are incorporated herein by reference).

Range and/or splitter shifting is manually initiated and may be fully or partially automatically implemented and/or controlled as described in copending U.S. patent application Ser. No. 08/649,827 now U.S. Pat. No. 5,651,292, entitled SPLITTER SHIFT MECHANISM AND CONTROL, and/or U.S. patent application Ser. No. 08/626,591, entitled MANUALLY SHIFTED TRANSMISSION WITH ENHANCED AUTOMATIC RANGE SHIFT, both assigned to EATON CORPORATION, the assignee of this application, the disclosures of which are incorporated herein by reference. The controller may be of the type illustrated in U.S. Pat. No. 4,595,986, the disclosure of which is incorporated herein by reference.

The transmission housing 116 comprises two major pieces, an extended generally cup-shaped gear housing piece 190 and a generally cup-shaped clutch housing piece 192. The gear housing piece 190 includes a base 194 which defines the rear end wall 116B, and a generally tubular portion 196 which surrounds and encloses the gearing and extends from the base to a flanged opening 198, which will receive a mating flange 200 provided on the clutch housing piece 192. The upper area of the tubular portion 196 is provided with a shift lever housing opening 202 and a plurality of axially extending bores, including bore 204A for partially defining cylinder 204B receiving the splitter piston assembly 204, bore 208 for receiving the single shift shaft 188, and bore 206A for partially defining cylinder 206B receiving the range piston assembly 206.

The clutch housing piece 192 will include a flanged base portion 192A defining forward end wall 116A and an outwardly and forwardly extending tubular portion 192B terminating at a forward flanged portion for mounting to the vehicular engine and enclosing the master clutch.

Figure 3:
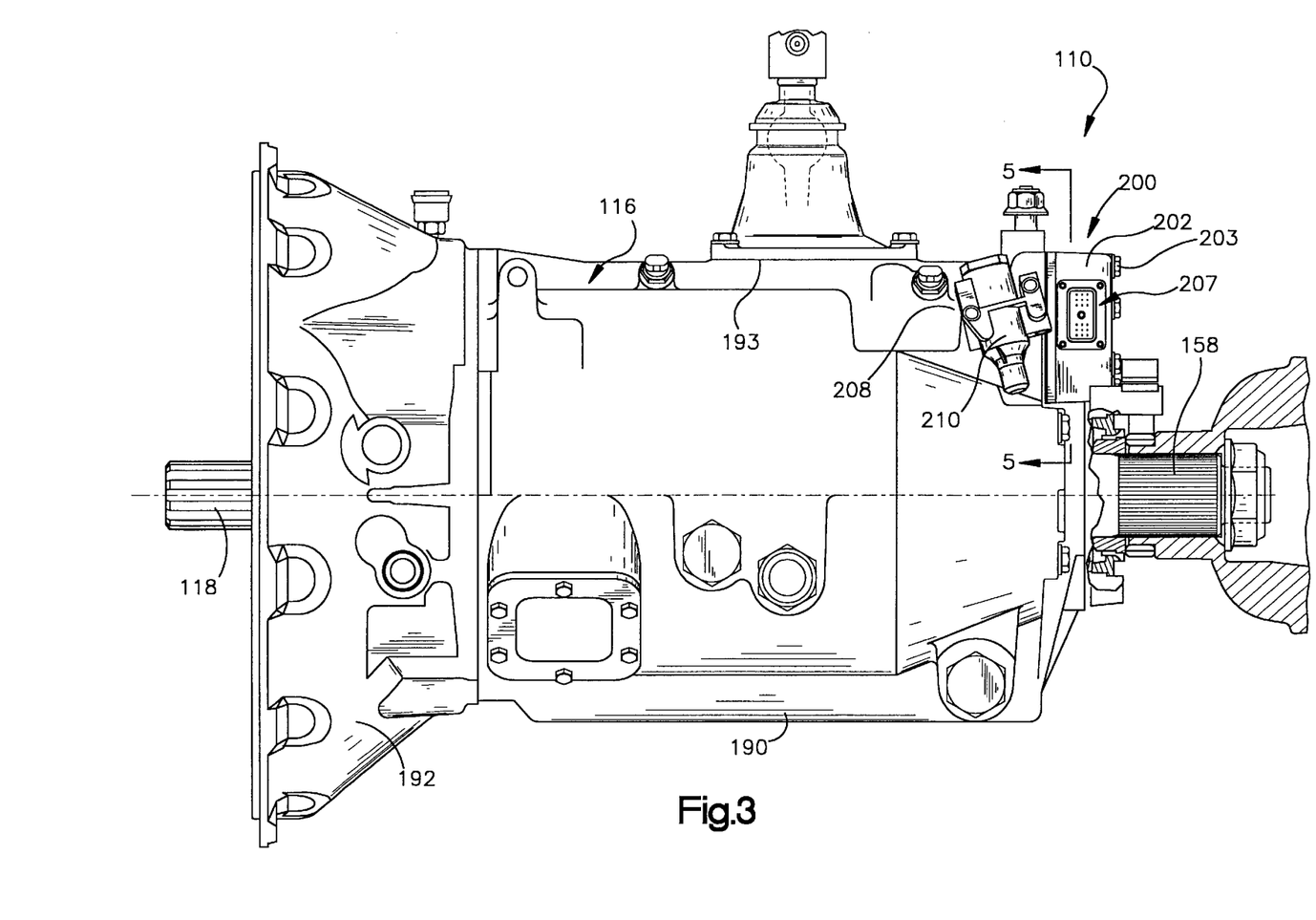
FIG. 3 is a side elevational view of the transmission of FIG. 1.
Figure 4:
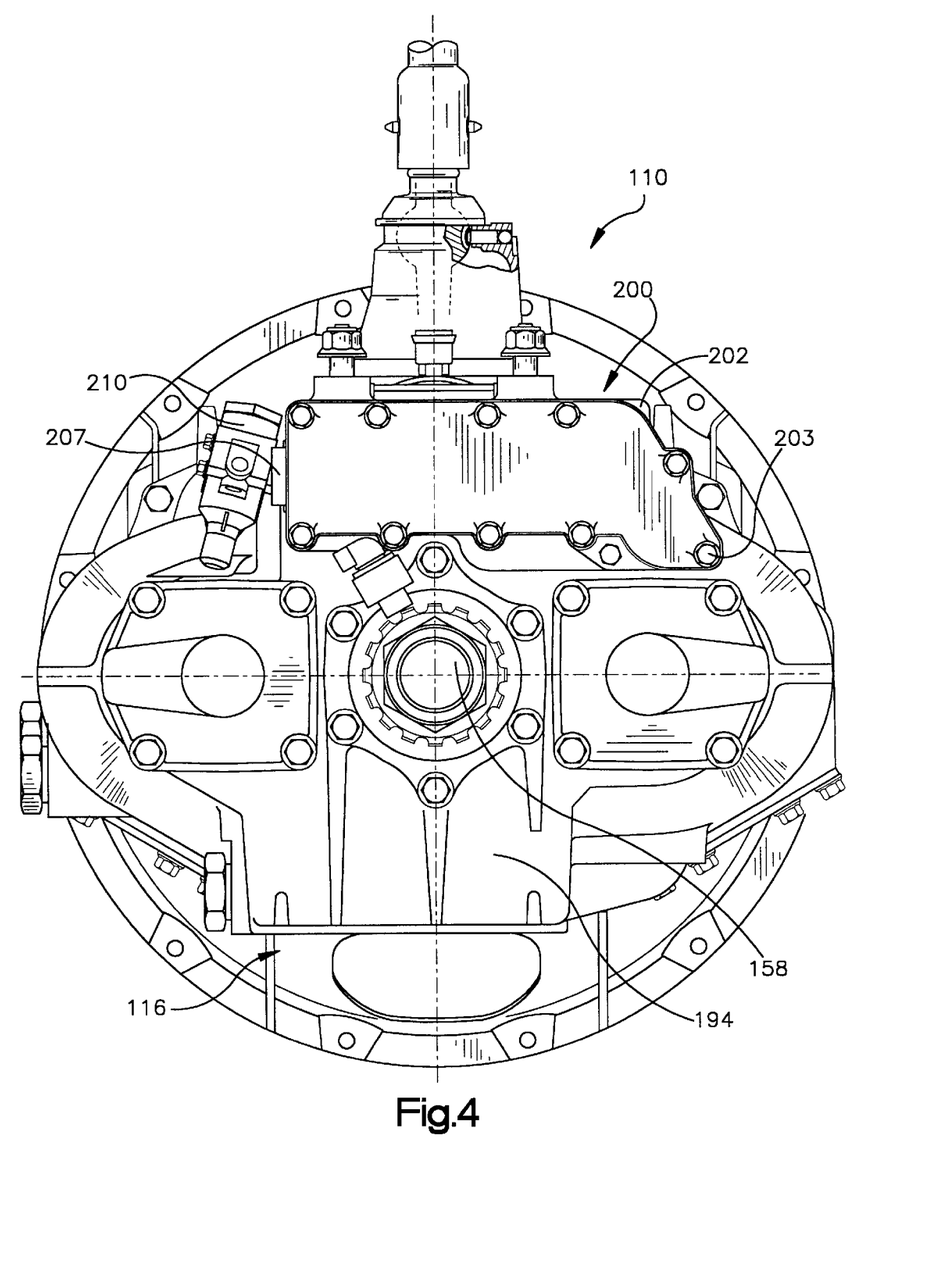
FIG. 4 is a rear elevational view of the transmission of FIG. 1.
Figure 5:
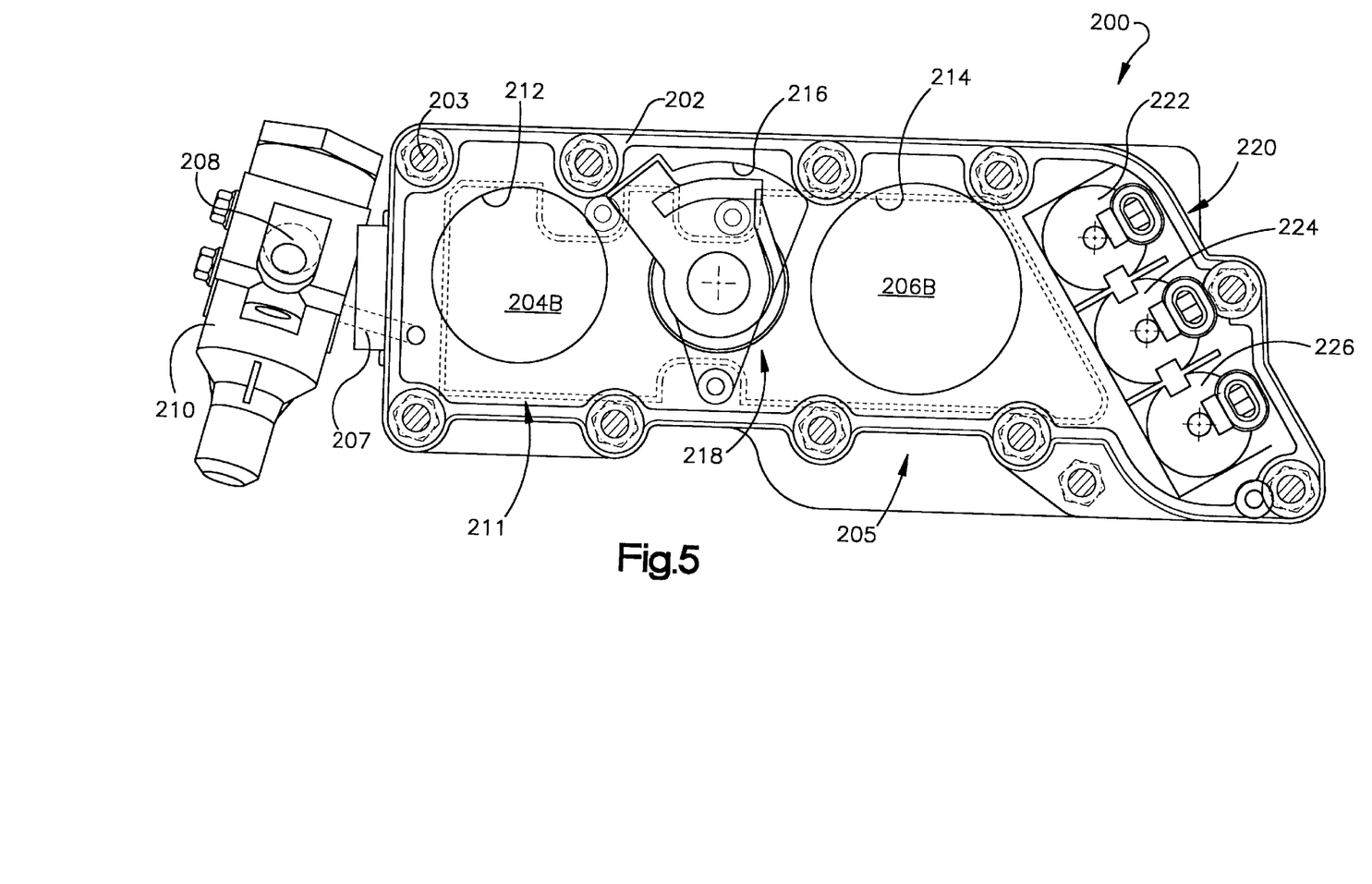
FIG. 5 is an enlarged rear elevational view, in section, of the control module of the present invention.

The mounting of the control module assembly 200 of the present invention to the upper rear of the transmission housing 116 may be seen by reference to FIGS. 3 and 4. FIG. 5 is a sectional view of the module assembly 200 taken approximately along line 5—5 in FIG. 3.

Control module assembly 200 provides a plurality of structural and control functions for the transmission 110 and is mountable to the transmission housing 116, at the base or end wall portion 194, as a one-piece unit. As may be seen, the module assembly 200 is contained within a cover member 202, such as a die casting, and removably mounts to the transmission housing by means of 8–10 bolts 203 or the like.

The control module assembly 200 defines a single external electrical connector 207, in the illustrated embodiment an 18-pin connector, and a single air supply port 208 associated with an integral pressure regulator and filter device 210 (usually referred to as a "filter regulator") and an exhaust. Other than connecting up to the connector 207 and port 208, no further external conduits or connectors are required for the functions of the control module assembly, minimizing the time and expense of assembly, minimizing the chances of connection-related mistakes, and improving the reliability of the transmission by minimizing external conduits and connectors.

A printed circuit board containing the auxiliary section shift controller is illustrated in outline by dashed line 211 in FIG. 5.

The control module assembly defines a first forwardly opening annular cavity 212 which cooperates and is coaxial with bore 204A to define the splitter piston cylinder 204B for splitter actuator 204, and a second forwardly opening annular cavity 214 which cooperates with bore 206A to define the range piston cylinder for range actuator 206.

The control module assembly 200 defines a third forwardly opening cavity or area 216 which is generally aligned with the bore 208 and single shift shaft 188. The assembly 200 includes a position sensor 218, as described in aforementioned copending application Ser. No. 08/695,052, entitled SHIFT SHAFT POSITION SENSOR [95-TRN-125], the disclosure of which is incorporated herein by reference, which receives the rear end 188A of the shift shaft 188 and provides signals indicative of the axial and rotational position thereof.

The control module assembly 200 also includes a bank 220 of solenoid-controlled valves. In the illustrated embodiment, solenoid-controlled valves 222 and 224 control the range actuator, while solenoid 226 controls the splitter actuator. The splitter and/or range actuator may operate as two- or three-position devices and may include a constantly pressurized chamber, as shown in copending application Ser. No. 08/597,304 and U.S. Pat. Nos. 5,231,895 and 4,899,607, the disclosures of which are incorporated herein by reference.

The control module assembly also defines at least a portion of a plurality of internal conduits from the filter/regulator 210 to the solenoid-controlled valves and/or the constantly pressurized actuator chambers and from the valves to exhaust and the selectively pressurized and exhausted actuator chambers. The assembly 200 also includes internal electrical connections from the connector 207 to the solenoids of valves 222, 224 and 226 and to the shift shaft position sensor 218.

The assembly 200 is configured such that when the assembly housing 202 is assembled to transmission housing 116, the cavities 212, 214 and 216 will properly align with bores 204A, 206A and 208, respectively, and the various passage portions in assembly 200 will properly align to interface with the associated passage portions defined in the housing.

Accordingly, by providing a control module assembly 200 as described and illustrated, transmission assembly and service is easier and less subject to assembly error and minimizes external conduits and connectors and possible damage thereto.

Accordingly, it may be seen that an improved housing and control module assembly for a compound change-gear transmission comprising two major pieces, an elongated cup-shaped gear housing piece and a cup-shaped clutch housing piece, is provided.

Although the present invention has been described with a certain degree of particularity, it is understood that the description of the preferred embodiment is by way of example only and that numerous changes to form and detail are possible without departing from the spirit and scope of the invention as hereinafter claimed.

We claim:

1. A control module assembly for one of a range, splitter and combined range-and-splitter compound transmission having a main section shifted by a movable shift shaft and an auxiliary section shifted by a first fluid-actuated piston device, said transmission contained within a transmission housing including a front wall portion, a rear wall portion and a generally tubular gear-retaining portion, said housing defining a first bore through said rear wall portion for receiving an end of said shift shaft and a second bore through said rear wall portion partially defining a cylinder for said first fluid-actuated piston device, said control module assembly comprising:

a generally cup-shaped module housing defining an interior cavity, said module housing mounted to the exterior of said rear end wall portion and allowing said assembly to be mounted to said transmission housing as a unit;

a position sensor in said interior cavity for receipt of the rear end of said shift shaft and for providing signals indicative of at least one of the rotational and axial position of said shift shaft;

a first forwardly-opening, cup-shaped cavity in said interior cavity for registration with said second bore to define said cylinder for said first fluid-actuated piston device;

a pressurized fluid connector accessible from the exterior of said module housing;

an electrical connector accessible from the exterior of said module housing;

a plurality of fluid conduits connected to said fluid connector in said interior cavity; and a plurality of electrical conduits connected to said electrical connector in said interior cavity.

2. The control module assembly of claim 1 further comprising at least one solenoid-controlled valve in said interior cavity.

3. The control module assembly of claim 1 wherein said main transmission section is shifted by a single rotationally and axially movable shift shaft, and said position sensor provides signals indicative to both axial and rotational positions of said shift shaft.

4. The control module assembly of claim 1 wherein said tubular portion and said rear wall portion of said housing are a one-piece member.

5. The control module assembly of claims 1, 2, or 3 wherein said transmission is a combined range-and-splitter-type compound transmission, said first fluid-actuated piston device controls range shifting, and further comprising a third bore through said rear wall portion partially defining a cylinder for a second fluid-actuated piston device controlling splitter shifting and a second forwardly-opening, cup-shaped cavity in said interior cavity for registration with said third bore to define said cylinder for said second fluid-actuated piston device.

6. The control module assembly of claim 5 including at least one solenoid-controlled valve in said interior cavity for each of said cylinders, said electrical conduits including conduits extending from said electrical connector to said sensor and to valves and said fluid conduits including conduits extending from said fluid connector to each of said valves and from each of said valves to one of said cylinders.

7. The control module assembly of claims 1, 2, or 3 further comprising a printed circuit board including an auxiliary section shift controller mounted in said interior cavity.

8. One of a vehicular range, splitter and combined range-and-splitter compound transmission (110) having a main section (112) shifted by a movable shift shaft (188) and an auxiliary section (114) shifted by a first fluid-actuated piston device (206), said transmission contained within a transmission housing (116) including a front wall portion (116A), a rear wall portion (116B) and a generally tubular gear-retaining portion, said housing defining a first bore (208) through said rear wall portion for receiving an end of said shift shaft and a second bore (206A) through said rear wall portion partially defining a cylinder (206B) for said first fluid-actuated piston device, and a control module assembly (200), said control module assembly mounted to said transmission housing as a unit and comprising:

- a generally cup-shaped module housing (202) mounted to the exterior of the rear end wall portion defining an interior cavity (205) and allowing said assembly to be mounted to said transmission housing as a unit;
- a position sensor (216) in said interior cavity for receipt of a rear end of said shift shaft and for providing signals indicative of at least one of the rotational and axial position of said shift shaft;
- a first forwardly-opening, cup-shaped cavity (214) in said interior cavity for registration with said second bore to define said cylinder for said first fluid-actuated piston device;
- a pressurized fluid connector (208) accessible from the exterior of said module housing;
- an electrical connector (207) accessible from the exterior of said module housing;
- a plurality of fluid conduits connected to said fluid connector in said interior cavity; and
- a plurality of electrical conduits connected to said electrical connector in said interior cavity.

9. The transmission of claim 8 wherein said control module assembly further comprises at least one solenoid-controlled valve (222, 224, 226) in said interior cavity.

10. The transmission of claim 8 wherein said main transmission section is shifted by a single rotationally and axially movable shift shaft, and said position sensor provides signals indicative to both axial and rotational positions of said shift shaft.

11. The transmission of claim 8 wherein said tubular portion and said rear wall portion of said housing are a one-piece member.

12. The transmission of claims 8, 9, or 10 wherein said transmission is a combined range-and-splitter-type compound transmission, said first fluid-actuated piston device controls range shifting, and said control module assembly further comprising a third bore (204A) through said rear wall portion partially defining a cylinder (204B) for a second fluid-actuated piston device (204) controlling splitter shifting and a second forwardly-opening, cup-shaped cavity (212) in said interior cavity for registration with said third bore to define said cylinder for said second fluid-actuated piston device.

13. The transmission of claim 12 wherein said control module assembly includes at least one solenoid-controlled valve in said interior cavity for each of said cylinders, said electrical conduits including conduits extending from said electrical connector to said sensor and to valves and said fluid conduits including conduits extending from said fluid connector to each of said valves and from each of said valves to one of said cylinders.

14. The transmission of claims 8, 9, or 10 wherein said transmission housing comprises:

- an elongated cup-shaped gear housing piece (190) including a base portion (194) defining the transmission rearward end wall and a generally tubular portion (196) extending from the base portion to a flanged opening (198); and
- a generally cup-shaped clutch housing portion (192) having a flanged base portion (200) for mounting to said flanged opening and defining the transmission forward end wall and an outwardly and forwardly flared portion (218) for mounting to an engine and defining an enclosure for surrounding a vehicular master clutch.

15. The transmission of claims 8, 9, or 10 further comprising a printed circuit board including an auxiliary section shift controller mounted in said interior cavity.

* * * * *